United States Patent

Wiley et al.

[11] Patent Number: 5,738,131
[45] Date of Patent: Apr. 14, 1998

[54] VALVE COUPLING METHOD AND APPARATUS

[75] Inventors: Larry W. Wiley, Los Banos; William P. Moreau, Fresno; John S. Williams, Coarsegold, all of Calif.

[73] Assignee: Buckner, Inc., Fresno, Calif.

[21] Appl. No.: 742,082

[22] Filed: Oct. 31, 1996

[51] Int. Cl.$^6$ .................................................. F16L 55/18
[52] U.S. Cl. ................... 137/15; 137/234.6; 137/363; 239/201; 239/276; 251/149.5
[58] Field of Search .................. 251/149.5; 239/276, 239/288.5, 201; 137/363, 234.6, 15

[56] References Cited

U.S. PATENT DOCUMENTS

| | | | |
|---|---|---|---|
| 2,805,099 | 9/1957 | Bailey. | |
| 2,829,907 | 4/1958 | Gill | 251/149.5 |
| 2,945,703 | 7/1960 | Ballard | 251/149.5 |
| 3,083,914 | 4/1963 | Smith. | |
| 3,193,205 | 7/1965 | Hanson. | |
| 3,658,086 | 4/1972 | Hart | 137/368 |
| 3,825,186 | 7/1974 | Heenan | 239/280 |
| 3,929,288 | 12/1975 | Brusadin | 239/201 |
| 4,365,750 | 12/1982 | Carlberg | 239/276 |
| 4,800,916 | 1/1989 | Lakey | 137/343 |
| 5,511,574 | 4/1996 | Macke | 137/363 |

OTHER PUBLICATIONS

RainBird Quick Coupling Valve brochure, 1995.
Leemco Quick Coupling Stabilizer brochure, 1995.
DURA quick lock & quick coupler outlet brochure, 1995.

*Primary Examiner*—A. Michael Chambers
*Attorney, Agent, or Firm*—Mark D. Miller

[57] ABSTRACT

An improved valve coupling method and apparatus is provided that resists the many forces associated with constant insertion and removal of access keys. The coupler apparatus is made of a non-corrosive metal alloy and includes a pair of specially formed integrated vertical wings which extend out in a tangential, as opposed to radial, direction from opposite sides of the coupler. Each of the wings is offset and includes at least one horizontal shelf portion. When buried in the soil, the vertical wings provide the coupler with frictional resistance to the screwing and unscrewing rotational forces imparted whenever a key is inserted or removed from the coupler, or from the movement of a hose attached to the key. Similarly, the horizontal shelf portions provide lateral support to resist the downward and upward forces associated with insertion and removal of a key, or contact with lawn maintenance equipment.

16 Claims, 8 Drawing Sheets

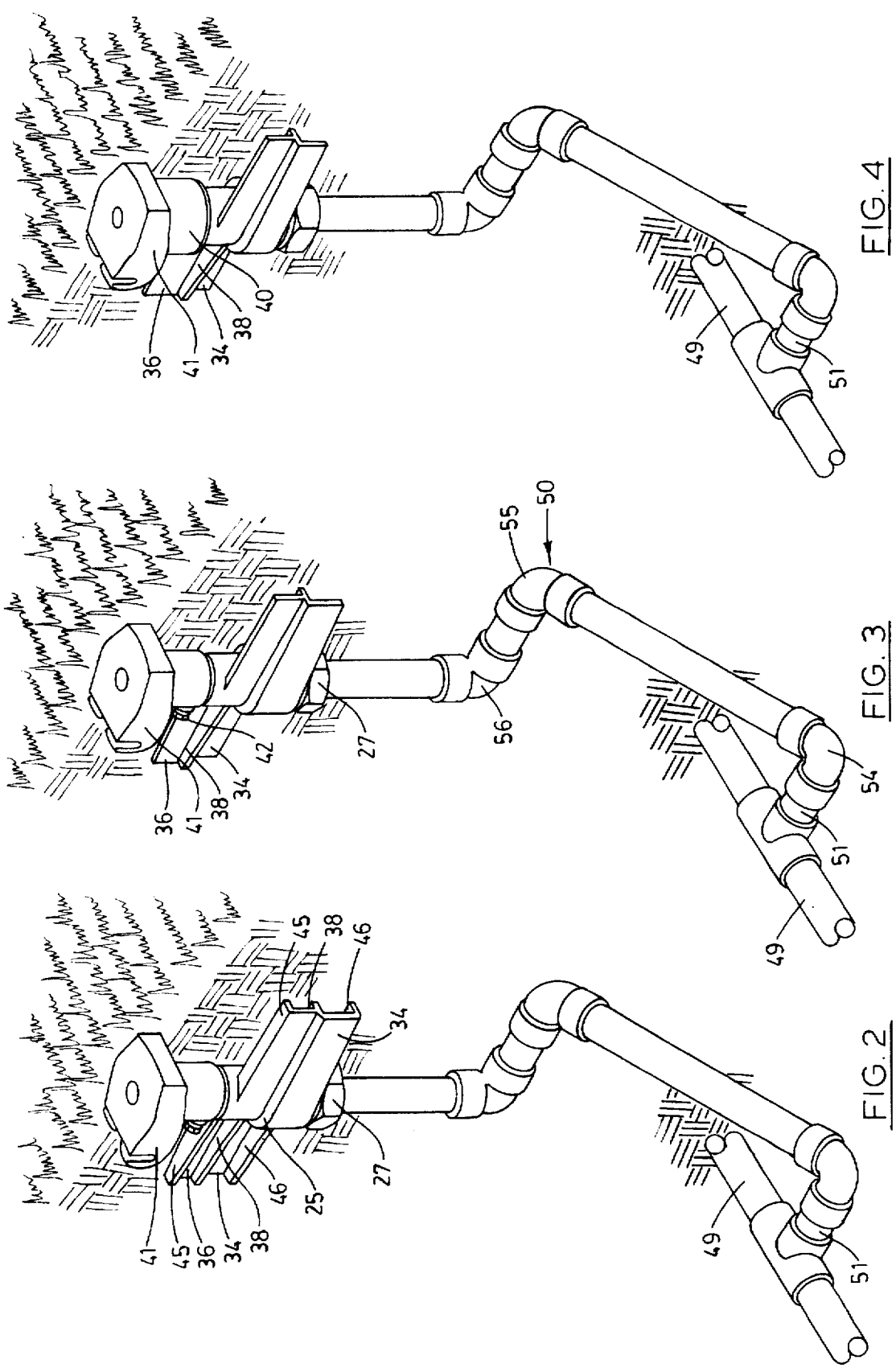

VALVE COUPLING METHOD AND APPARATUS

BACKGROUND OF THE INVENTION

1. Field of the Invention

The present invention relates to irrigation valves, and more particularly to an improved irrigation valve coupler which provides improved support and prevents unwanted destabilizing rotation.

2. Description of the Prior Art

Irrigation valve coupling devices are well known and in widespread use in lawns and golf courses throughout the country. The most common valve couplers are in the form of a hollow tube having a spring-loaded valve on the inside, and a hinged cover plate at one end. Such tubes are designed to be installed in a vertical position, connected to an underground irrigation water conduit line by national pipe threads (NPT) or other threads, and buried in the soil such that only the hinged plate is visible at the surface.

Access to such valve couplers is obtained by the use of a separate removable hollow shaft or "key" which fits into the coupler when the hinged plate is opened. The opposite end of the key is attached to a hose or pipe eventually terminating at a sprinkler or other irrigation apparatus. Downward and rotational pressure is exerted by insertion of the key into the coupler. This causes the spring-loaded valve inside the coupler to open, allowing water under pressure to escape through the key. Such downward pressure is exerted by turning or screwing the key into the coupler (usually in a clockwise direction). A typical key includes at least one locking pin which fits into a corresponding helical groove on the inside of the coupler. If multiple pins are supplied on the key, corresponding multiple grooves are provided in the coupler. An upward detent is provided at the end of each groove to receive each pin. After approximately one full turn, the pin reaches the detent. When this occurs, forces created from the water pressure react against the key pushing the pin into the upper detent, locking the key into the coupler valve. When the desired irrigation is complete, removal is accomplished by first exerting downward pressure on the key to free the pin from the detent. Then, reverse rotational force (usually counter-clockwise) is exerted to unscrew the key. The spring-loaded valve inside the coupler then closes, thereby again holding the water pressure inside. If sufficient downward force is not exerted, the key will not be unlocked, and rotational forces can be transmitted directly to the coupler valve where it is threaded onto the water pipe.

Another version of the key has a male thread form on the key which corresponds to a helical female thread form in the coupler valve. A shoulder is provided on the key above the male threads which stops the threading of the key into the coupler, and locks the key into place.

Valve couplers of the type described above suffer from several drawbacks. The most serious is the effect on the coupler of the constant exposure to both clockwise and counter-clockwise rotation by the key. Such rotation may be easily transferred directly to the coupler, particularly when the key is being unscrewed from a locked position, resulting first in loosening, and eventually in detachment of the coupler itself from the water line. Detachment can easily occur as a key is being removed from the coupler. In these situations, the high water pressure in the line can cause the heavy coupler to be thrown several feet up into the air exposing the user to injury.

Another serious drawback suffered by such couplers is the lack of lateral support (for vertical motion) afforded to such couplers as a result of the relatively recent adoption of swing joints by the industry. Until recently, couplers of the type described above were ordinarily attached to a vertical pipe extending up from an inverted "T" in a horizontal water supply line. The horizontal line in such an attachment would provide lateral support preventing the coupler from being pushed into the ground or pulled out from the vertically oriented pipe without being unscrewed. In addition, such earlier pipes were typically made of galvanized steel with NPT threads which provided a high level of rotational resistance to the coupler valve helping to prevent it from being unscrewed from the pipe.

The adoption and use of swing joints to support couplers has become widespread because of the adjustability of the joint for proper positioning of the coupler. A typical swing joint has no less than three (3) ninety degree elbows joining sections of pipe together (See FIGS. 2–4 herein). Adjusting the positions of the elbows to provide proper positioning of the coupler valve is a simple task because the elbows remain free to rotate on the pipe sections even after installation. Therefore, such swing joints not only separate the coupler from the main water line, but also are free to rotate thereby depriving the coupler of important lateral support. This allows the coupler to be easily pushed into or pulled out from the soil while still being connected to the water pipe system. Such movement makes the coupler valve very difficult to use, creates hazards when lawns are mowed, and could eventually dislodge the coupler from the swing joint, rupture the joint itself at any weak point, or any of the above. Additionally, the swing joints are made of polyvinyl chloride (PVC) which provides less rotational resistance in the threads than galvanized pipe thereby increasing the likelihood that the coupler could be unscrewed from the pipe.

In practical use, a hose is attached to the coupler key. As a person walks around spraying an area of ground, rotational forces can be transmitted from the hose to the coupler key which is locked in the coupler valve. These rotational forces can also cause the coupler valve to be partially or entirely unscrewed from the water pipe.

A number of inadequate solutions have been proposed to prevent unwanted detachment of the coupler described above from the water source line. One solution involves affixing the coupler to a stationary object such as a stake driven into the ground. One or more metal clamps are then used to hold the coupler against the stake. A variation of this solution involves imbedding one or more stakes in sub-surface concrete, as is suggested in U.S. Pat. No. 5,511,574, and attaching them to the coupler pipe. The problem with such solutions is that they are only as dependable as the stake or the method of attachment. These methods will fail if the stake becomes loosened in the ground, if the clamp becomes loosened from the stake, or if the stake fails as a result of shifting, rotting or rusting. The use of sub-surface concrete will provide a more secure environment, but is time consuming and expensive, and may make repairs difficult and cumbersome.

Another inadequate solution is the use of a lateral bracket which is attached to the base of the valve. In one version, a U-bolt is passed around the body of the valve and attached to an elongated metal bar. In another version, the bracket is an elongated flange with a central opening having a single bolt which is used to attach the bracket to the valve. The problem with such brackets is that they can become easily dislodged from the valve since only U-joint or a single bolt (without any nut assembly for the bolt to fit into) holds the bracket in place. Continued use of the valve can loosen the bolt seriously affecting its stabilizing effect. Moreover, the constant exposure to water can cause such an iron bracket to rust and break, rendering it useless.

In addition to the above, the following U.S. Patents are also known to exist:

| U.S. Pat. No. | Issue Date | Inventor |
|---|---|---|
| 2,805,099 | September 3, 1957 | Bailey |
| 3,083,914 | April 2, 1963 | Smith |
| 3,193,205 | July 6, 1965 | Hanson |
| 3,658,086 | April 25, 1972 | Hart |
| 3,825,186 | July 23, 1974 | Heenan |
| 3,929,288 | December 30, 1975 | Brusadin |
| 4,365,750 | December 28, 1982 | Carlberg |
| 4,800,916 | January 31, 1989 | Lakey |
| 5,511,574 | April 30, 1996 | Macke |

Faced with deadlines and pressure to cut costs, an unscrupulous contractor may elect to simply omit any support for the coupler valve at all since, once buried, there is no visible evidence of any such omission. It is therefore desirable to provide a reliable quick coupling valve device that assures the user that it has been installed, which provides rotational support to avoid becoming unscrewed from the main line, and also provides lateral support to avoid becoming pushed into or pulled from the ground.

SUMMARY OF THE INVENTION

The present invention overcomes the above described problems by providing a quick coupling valve device for use with a rotationally removable key that is made of a non-corrosive metal alloy and which includes a pair of specially formed integrated flanges or wings extending out from either side of the valve. The valve includes a hollow sleeve with a central external shoulder and a spring-loaded valve inside. A hexagonal or other (i.e. octagonal) appropriate nut assembly is provided at the exterior of the base of the sleeve. A pair of outwardly extending wings are integrally attached on opposite sides of the sleeve. Each of the wings is offset such that the vertical portions extend out in a tangential manner from, respectively, the front and back of the sleeve. Each wing is also provided with a horizontal shelf portion which conforms with a central shoulder of the sleeve. A hinged cover plate and sleeve extension may be provided either integrally with the sleeve, or as part of a separate attachment at the top of the sleeve.

The integral construction of the valve coupling device of the present invention assures that the stabilizing wings will not become dislodged from the sleeve itself, or disengaged, as is possible with non-integral designs. The integral construction also assures that installation of the wings will not be omitted during construction. The offset, tangential positioning of the wings provides friction with the soil that is substantially greater than that provided by wings that simply extend radially outward from the center. The wings have a cross section and are angled from the outside-in so that any attempted rotation of the sleeve causes dirt and material to bunch up against the sleeve and wing cross section causing more desired resistance. This is especially important when the coupler valve is attached to the now-popular PVC swing joint which provides lower rotational resistance in the threads.

The horizontal shelves in the wings have a cross section which provides lateral support to the coupling device preventing it from being pushed into or pulled out from the soil, especially when installed with a swing joint. The stability provided by the horizontal and vertical aspects of the wings prevents the coupling device from being unscrewed from its feed pipe or from being moved up or down which could rupture the pipe or swing joint, expose the coupler to damage by lawn maintenance equipment, or make the coupler difficult to access. There is no chance of detachment of the wings from the sleeve, and the metal alloy used is the same corrosion resistant material of the sleeve itself such that it will not rust or deteriorate. An added benefit of the integral wings is that the wings themselves may be used to help attach the coupler sleeve to the irrigation pipe during initial installation.

From a manufacturing standpoint, the integrated unit which includes the main sleeve body and both of the outwardly extending wings can be single cast as one piece in an appropriate mold. Horizontal flanges may be added to the wings at the upper and/or lower ends, to provide further lateral support in the device, without departing significantly from the molding process.

It is therefore a primary object of the present invention to provide an irrigation coupling sleeve having a pair of integral external wings which, when buried in the ground, provide friction with the ground which prevents the sleeve from being rotationally disengaged from its water pipe source, thereby avoiding potential injury to persons or damage to the irrigation system.

It is also a primary object of the present invention to provide an irrigation coupling sleeve with integral external wings having at least one horizontal shelf thereon to prevent the integrated assembly from being easily pushed into or pulled out from the soil in which it is buried, thereby avoiding potential damage to the irrigation system.

It is a further important object of the present invention to provide an irrigation coupling sleeve having integral external support wings thereby avoiding omission and assuring that such support wings are, in fact, installed when the sleeve is installed.

It is a further important object of the present invention to provide an irrigation coupling sleeve with integral external support wings which cannot become disengaged or dislodged from the sleeve itself during installation or use.

It is a further important object of the present invention to provide an irrigation coupling sleeve with integral external support wings in an integrated assembly made of corrosion-resistant material in order to prevent the wings from becoming detached, dislodged or disengaged from the sleeve.

It is a further important object of the present invention to provide an irrigation coupling sleeve with integral external support wings which provides lateral support when such integrated assembly is installed using a swing joint.

It is a another object of the present invention to provide an irrigation coupling sleeve with integral external support wings which provide rotational and lateral stability without the addition of any external parts, stakes, clamps or concrete.

It is a another object of the present invention to provide an irrigation coupling sleeve with integral external support wings that are attached tangentially to opposite ends of the sleeve and offset in order to provide better rotational resistance and stability due to higher soil compaction and entrapment of the soil than radially extending wings.

It is a another object of the present invention to provide an irrigation coupling sleeve with integral external support wings that is easy to manufacture in several different forms.

It is a another object of the present invention to provide an irrigation coupling sleeve with integral external support wings which wings can be used to help attach the coupler sleeve to an irrigation pipe during initial installation.

It is a another object of the present invention to provide an irrigation coupling sleeve with integral external support wings attachable to a hinged cover plate and sleeve extension.

It is a another object of the present invention to provide in a single unit, an irrigation coupling sleeve with integral external support wings and an integral sleeve extension which includes a hinged cover plate.

Other objects of the invention will be apparent from the detailed descriptions and the claims herein.

BRIEF DESCRIPTION OF THE DRAWINGS

FIG. 2 is a partially cut away perspective view of a version of the invention showing it installed under ground and attached to a typical swing joint irrigation pipe.

FIG. 3 is a partially cut away perspective view of another version of the invention showing it installed under ground and attached to a typical swing joint irrigation pipe.

FIG. 4 is a partially cut away perspective view of the preferred embodiment of the invention showing it installed under ground and attached to a typical swing joint irrigation pipe.

DETAILED DESCRIPTION OF THE DRAWINGS

Figure 1:
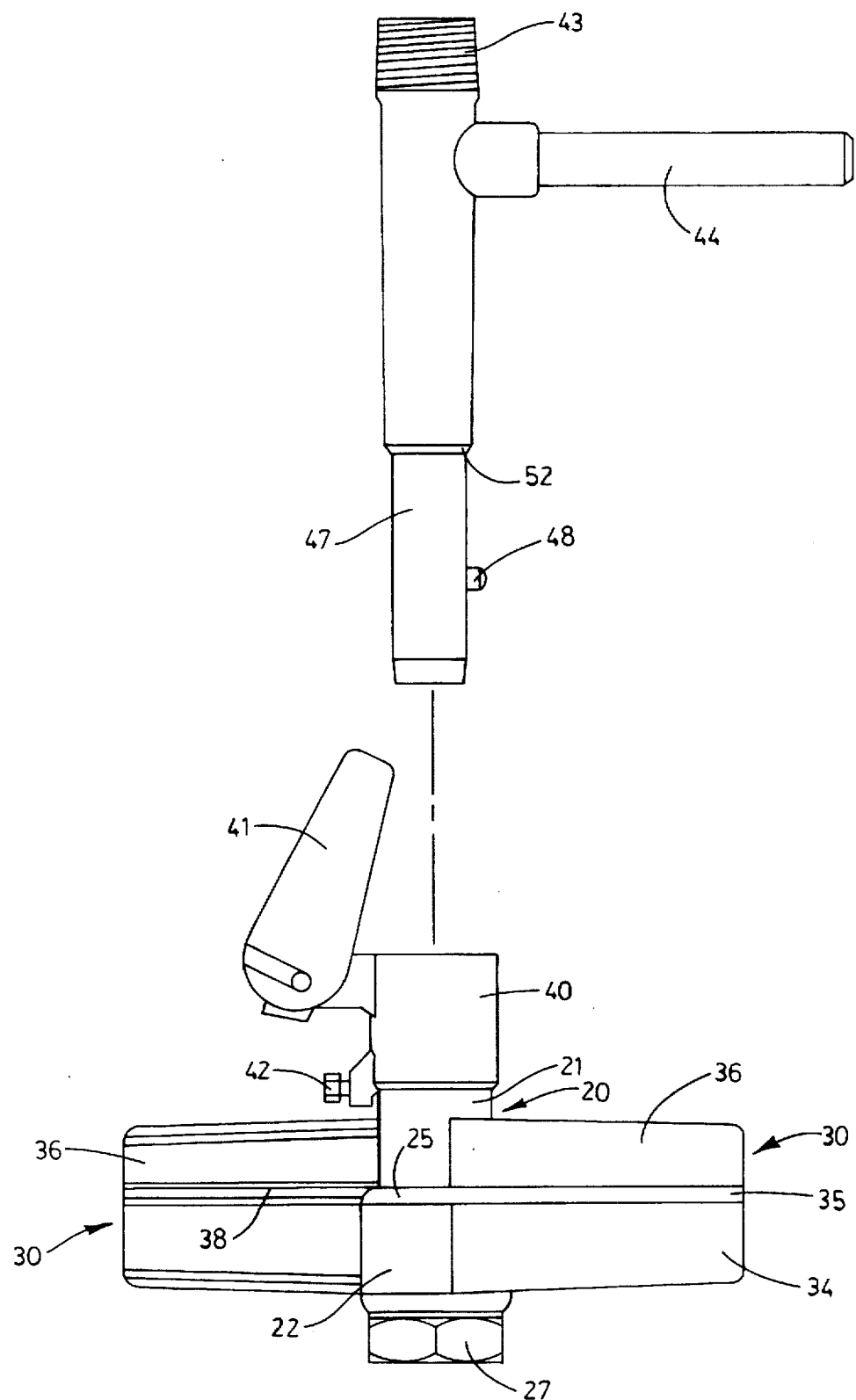
FIG. 1 is a side view of a version of the coupler of the present invention showing the hinged cover plate in an open position and a key suspended above the coupler awaiting insertion.
Figure 6:
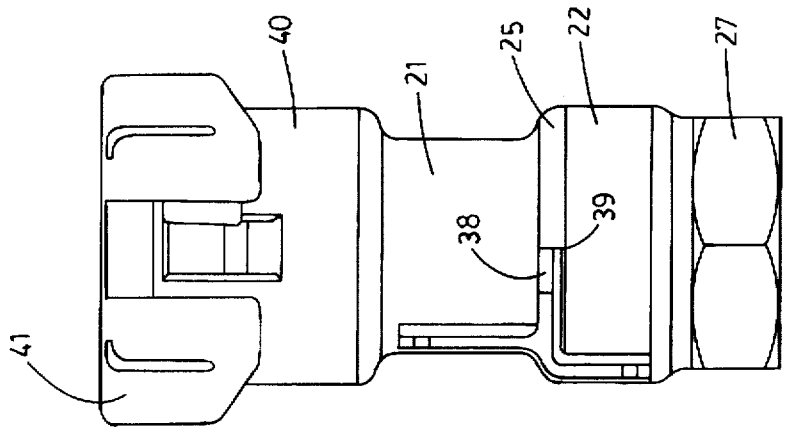
FIG. 6 is an opposite end view of the preferred embodiment of the present invention shown in FIG. 5.
Figure 5:
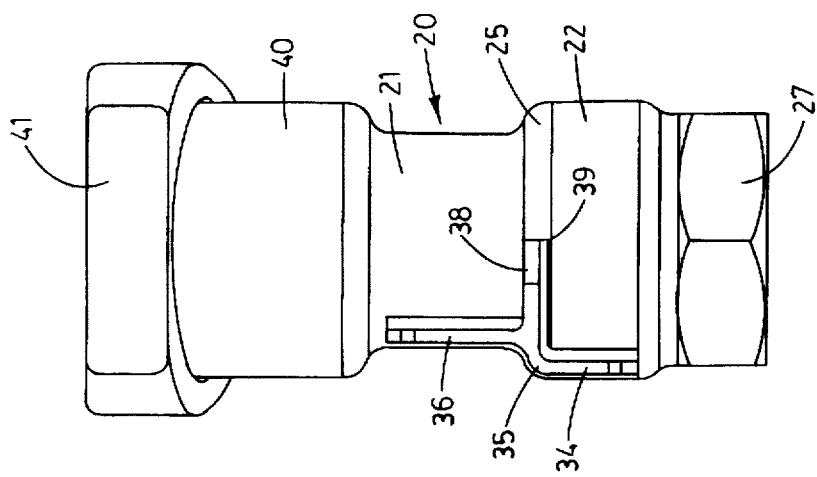
FIG. 5 is an end view of the preferred embodiment of the present invention.
Figure 7:
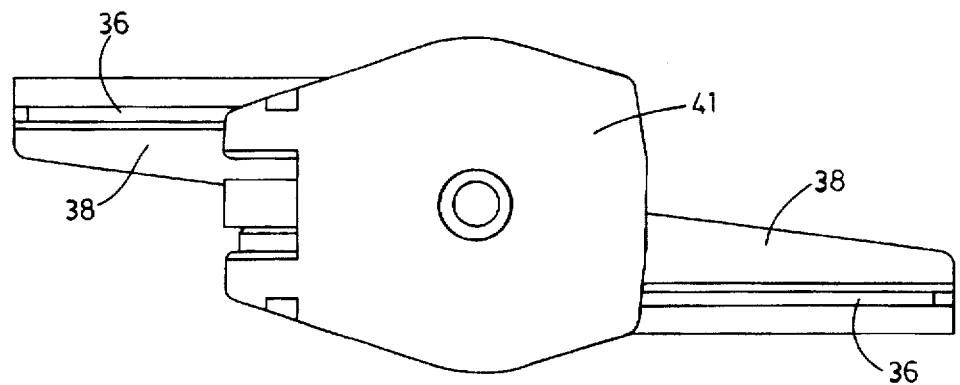
FIG. 7 is a top plan view of the preferred embodiment of the present invention.
Figure 8:
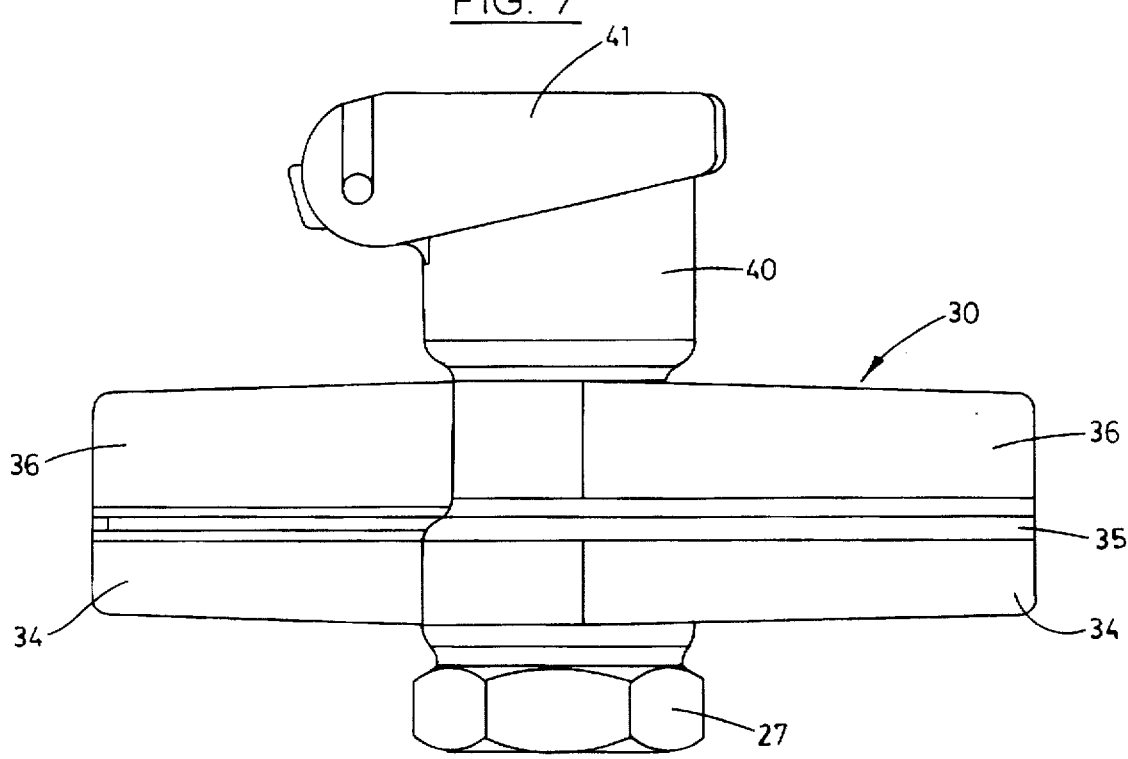
FIG. 8 is a side elevational view of the preferred embodiment of the present invention.
Figure 9:
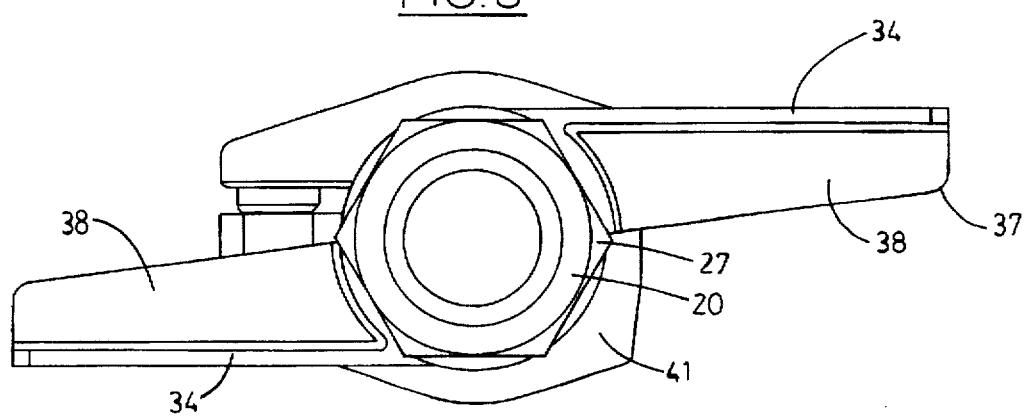
FIG. 9 is a bottom plan view of the preferred embodiment of the present invention.
Figure 11:
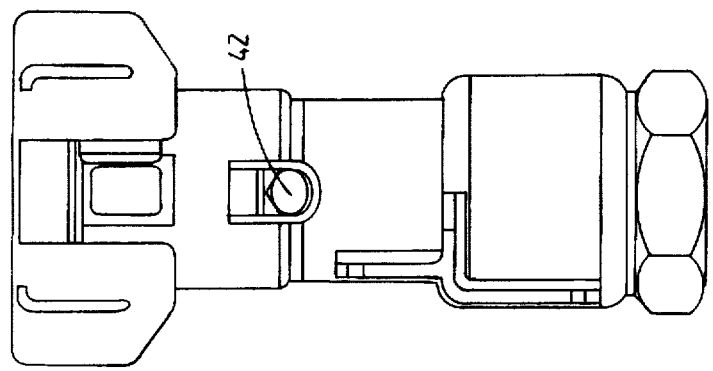
FIG. 11 is an opposite end view of the embodiment of the present invention shown in FIG. 10.
Figure 10:
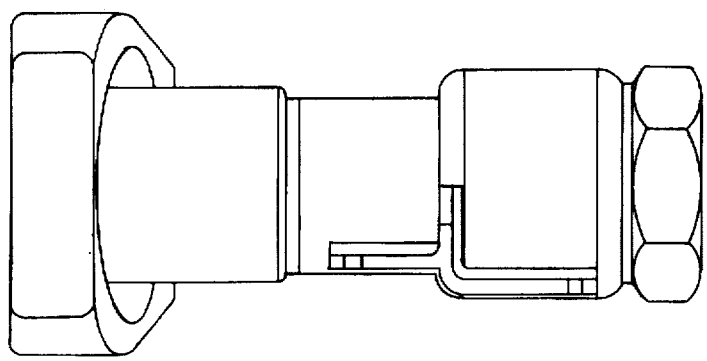
FIG. 10 is an end view of an alternative embodiment of the present invention.
Figure 12:
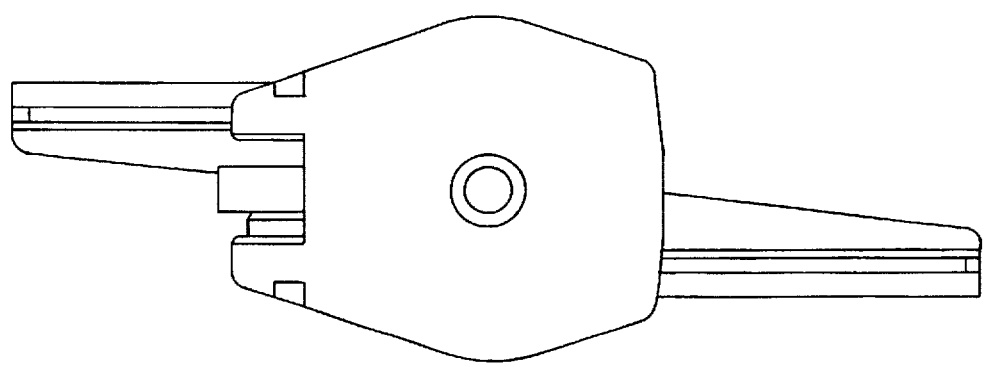
FIG. 12 is a top plan view of the alternative embodiment of the present invention shown in FIG. 10.
Figure 13:
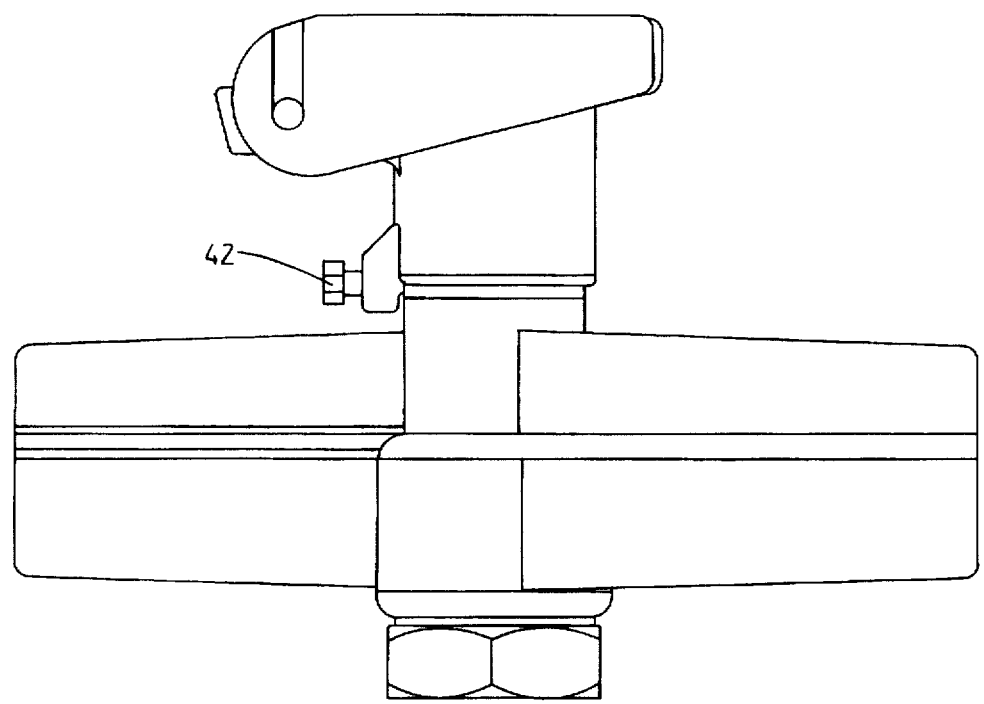
FIG. 13 is a side elevational view of the alternative embodiment of the present invention shown in FIG. 10.

Referring to the drawings wherein like reference characters designate like or corresponding parts throughout the several views, and referring particularly to FIGS. 1 and 2, it is seen that the invention includes a coupler in the form of a hollow sleeve 20 having an upper section 21 and a lower section 22 separated by a shoulder 25. At the lower end of sleeve 20 a hexagonal or other (i.e. octagonal) appropriate nut assembly 27 is provided. A spring-loaded valve (not shown) is provided inside sleeve 20.

A sleeve extension 40 having a hinged cover plate 41 is provided which fits onto upper section 21 of sleeve 20. In the embodiment shown in FIG. 1, sleeve extension 40 is separate from sleeve 20, and is attached by threading sleeve extension 40 onto sleeve 20, and includes a bolt 42 or other suitable device for firmly securing sleeve extension 40 to sleeve 20. In the preferred embodiment shown in FIGS. 5-9, sleeve extension 40 is part of a single cast integrated assembly which includes sleeve 20 and wings 30, described more fully below.

A key 47 is shown suspended above sleeve extension 40 in FIG. 1. Cover plate 41 is open and the key 47 is ready to be inserted into the coupler 20. As key 47 is inserted, downward pressure is placed on the coupler 20. Key 47 is also rotated and screwed into coupler 20 in order to open the spring-loaded valve (not shown) inside. The key is rotated by use of handle 44. Pin 48 is used to lock key 47 into place in a groove and detent (not shown) inside coupler 20 while in use, allowing water to flow through the key and into an irrigation hose (not shown) threaded onto section 43 at the top of the key. Some versions include multiple pins 48 on the key, and multiple corresponding grooves with detents in the coupler 20. Other versions have a male thread form in place of pin 48 which engage a corresponding female thread form in the coupler. In such versions, shoulder 52 becomes a positive stop to lock the key into place. Key 47 is removed from the coupler 20 by reversing the rotation and applying upward force. Once installed, coupler 20 is constantly subjected to the upward, downward, rotational and reverse-rotational forces associated with insertion and removal of keys 47, and movement of the hose attached to the key.

FIGS. 2-4 a show different embodiments of the present invention installed in the ground and attached to a swing joint assembly 50. The swing joint is attached at one end to the main water line 49. In the swing joint assembly shown, a secondary pipe 51 branches from main line 49, and passes through three separate ninety degree (90°) elbows 54, 55 and 56 before being attached to the bottom of sleeve 20 at nut 27. These elbows are free to rotate even after installation. As a result of the use of the swing joint, it is seen that no lateral support is provided to the coupler sleeve 20 by main line 49.

Figure 14:
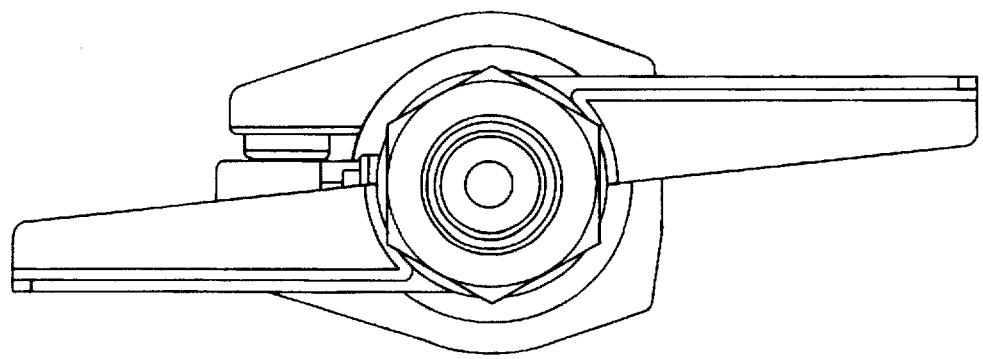
FIG. 14 is a bottom plan view of the alternative embodiment of the present invention shown in FIG. 10.
Figure 16:
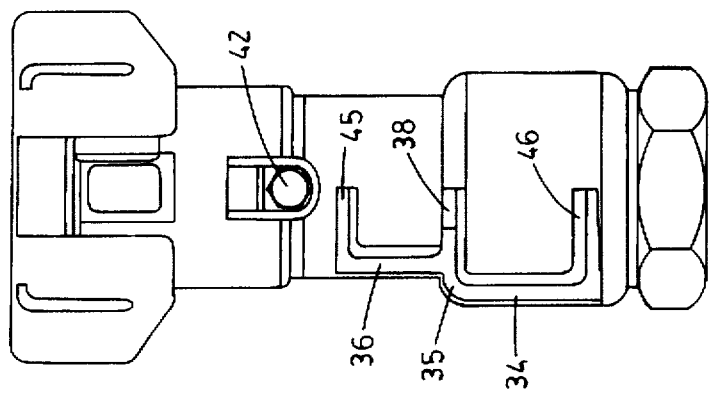
FIG. 16 is an opposite end view of the embodiment of the present invention shown in FIG. 15.
Figure 15:
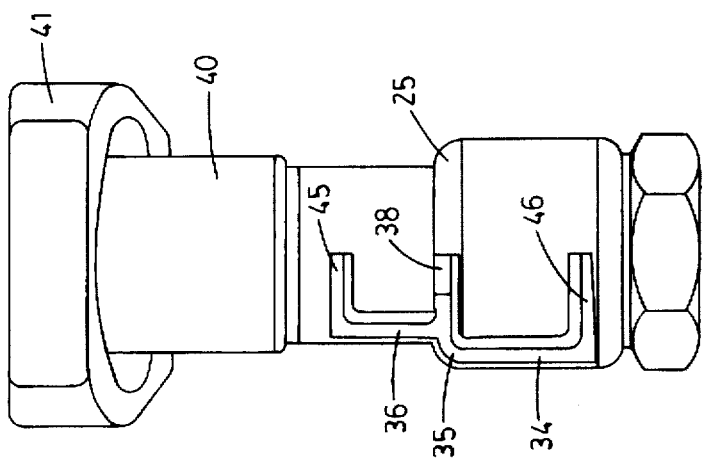
FIG. 15 is an end view of another alternative embodiment of the present invention.
Figure 17:
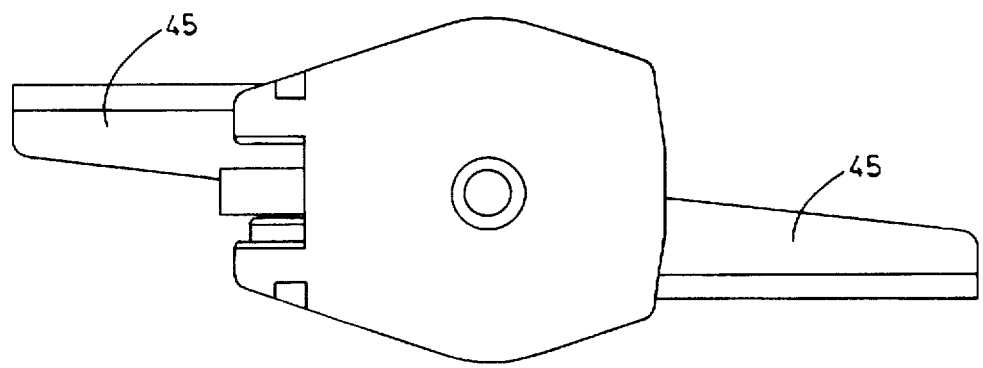
FIG. 17 is a top plan view of the alternative embodiment of the present invention shown in FIG. 15.
Figure 18:
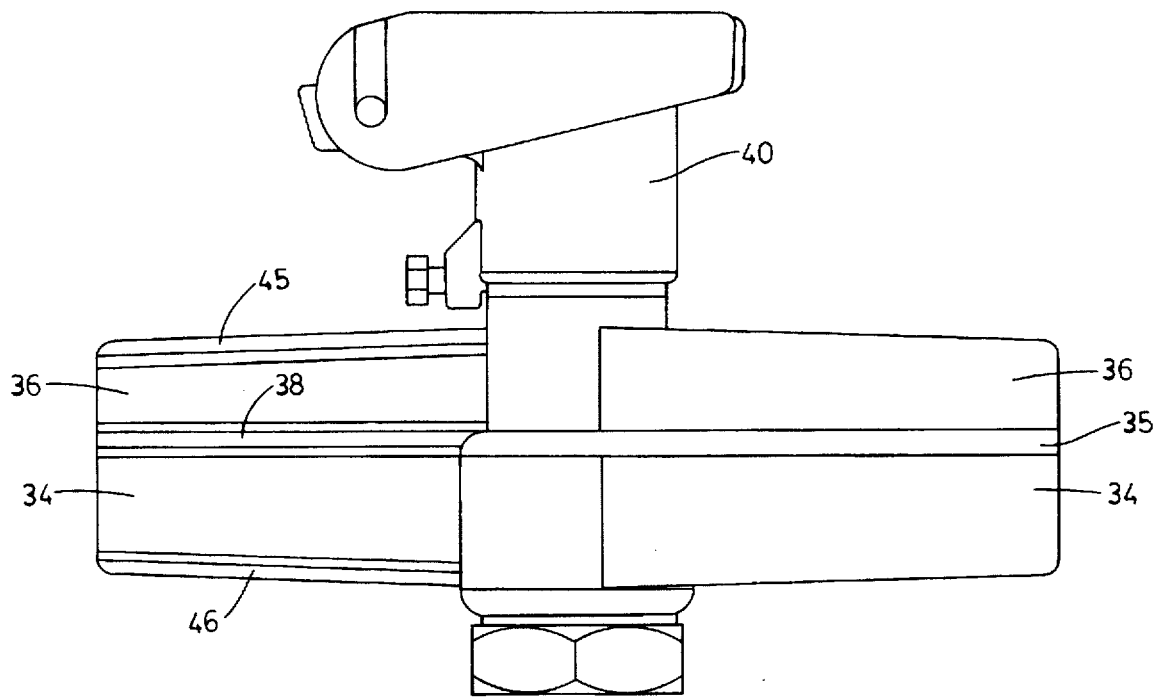
FIG. 18 is a side elevational view of the alternative embodiment of the present invention shown in FIG. 15.
Figure 19:
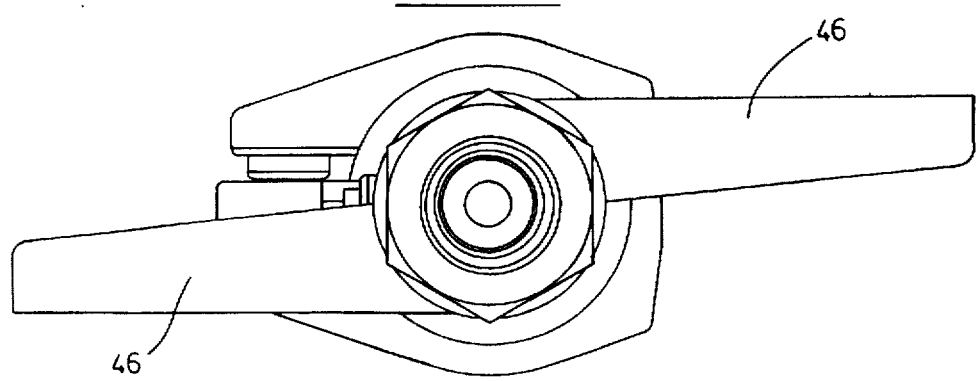
FIG. 19 is a bottom plan view of the alternative embodiment of the present invention shown in FIG. 15.

A pair of outwardly extending flanges or wings 30 are integrally provided as part of sleeve 20 in all embodiments. The two wings 30 are attached to sleeve 20 at diametrically opposite locations, and extend outward in a tangential, as opposed to radial, direction. (See the bottom views of FIGS. 9, 14 and 19.) Each of wings 30 includes an upper vertical section 36 and a lower vertical section 34 separated by a shoulder 35. The height of upper sections 36 correspond generally with the height of sleeve section 21; likewise, the height of lower sections 34 correspond generally with the height of sleeve section 22. The width of each of sections 34 and 36 can be from several inches to a foot, thereby providing a significant cross section for resistance in each wing 30. Shoulders 35 correspond with shoulder 25.

In the preferred embodiment, each wing 30 is also provided with at least one horizontal section or shelf 38 on the inside of shoulder 35. The proximal end of shelf 38 extends from the hilt of tangential wing 30 along shoulder 25 to a mid point 39. Shelf 38 extends outward along wing 30 to its distal end 37, and angles back from end 37 to mid point 39 on shoulder 25, thereby defining a significant cross section.

In the alternative embodiment shown in FIGS. 2 and 15-19, additional horizontal shelves 45 and 46 are also provided, respectively, at the top of upper section 36, and at the bottom of lower section 34. Either or both of these additional shelves (45 and 46) may be provided in addition to shelf 38. Each additional shelf 45, 46 provides a further cross section and more lateral support to the assembly, which is particularly useful when the coupler is attached to a swing joint as shown in FIG. 2.

DESCRIPTION OF PREFERRED EMBODIMENTS

In the preferred embodiment, sleeve 20, nut 27, wings 30, and sleeve extension 40 are cast as a single integrated unit, and should be made of a corrosion-resistant metal such as brass. Wings 30 should be attached at diametrically opposite places on the outside of sleeve 20, and extend in a tangential direction outward. The height of each wing should roughly correspond to the height of the coupler sleeve 20. At least one integral horizontal shelf 38 is desirable in each of the wings 30 in order to provide lateral support in the device.

In alternative embodiments, sleeve extension 40 may be a separate piece that is threadably attached to sleeve 20 in conjunction with a bolt 42 or some other suitable securing device to lock the pieces together. Alternative embodiments may include additional upper shelf 45, lower shelf 46, or both, to provide additional lateral support. Nut 27 may be hexagonal, octagonal, or in any other appropriate shape to facilitate easy engagement with a mounting wrench.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A method for providing resistance to the rotational and vertical forces encountered by a sub-surface water line coupling apparatus comprising the steps of:

a. attaching a hollow open-ended vertically oriented cylindrical sleeve having a spring-loaded valve inside, to a water supply line using a set of helical threads inside the lower end of said sleeve, said sleeve including a pair of integral outwardly extending vertically oriented flanges, said flanges originating at diametrically opposite locations on said sleeve and extending tangentially out therefrom, each of said flanges also including at least one horizontal shelf thereon;

b. burying said sleeve and flanges just below the surface of the ground so that said flanges engage with sub-surface material to provide rotational stability to said sleeve;

c. firmly packing down the material surrounding said buried sleeve and flanges so that said each shelf engages with sub-surface material to provide lateral stability to said sleeve.

2. The method of claim 1 comprising the further step of accessing said buried sleeve using an external key in the form of a hollow cylindrical shaft which fits into the open upper end of said sleeve.

3. The method of claim 2 comprising the further step of rotatably inserting said external key into said shaft such that an outwardly protruding pin on said key fits into a helical groove on the inside of said sleeve, said groove including an upward detent at one end for temporarily locking said pin into place.

4. An coupling apparatus for sub-surface attachment to a water supply line affording access to the line by use of an external key, said apparatus comprising a hollow open-ended vertically oriented cylindrical sleeve having a spring-loaded valve inside, a set of helical threads inside the lower end for connection to the line, and an opening at the upper opposite end for receiving the shaft of said access key, said sleeve including a pair of integral outwardly extending vertically oriented flanges, said flanges defining a cross section for engagement with sub-surface material to provide rotational stability, said flanges originating at diametrically opposite locations on said sleeve and extending tangentially out therefrom.

5. The apparatus described in claim 4 wherein each of said flanges is also provided with at least one horizontal shelf having a cross section for engagement with sub-surface material to provide lateral stability to the apparatus.

6. The apparatus described in claim 5 wherein the upper end of said sleeve is provided with at lease one helical groove on the inside for receiving a corresponding number of pins on said key, each such groove including an upward detent at one end for temporarily locking each such pin into place.

7. The apparatus described in claim 6 wherein the upper end of said sleeve includes a hinged cover plate.

8. The apparatus described in claim 5 wherein the upper end of said sleeve is provided with a female thread form on the inside for receiving a corresponding male thread form on said key, said key including a shoulder above the male thread form for temporarily locking said key into place.

9. The apparatus described in claim 3 wherein said sleeve and integral wings are made of a non-corrosive material.

10. The apparatus described in claim 5 wherein a sleeve extension is provided for threadable attachment to the upper end of said sleeve, said extension including at least one helical groove on the inside for receiving a corresponding number of pins on said key, each such groove including an upward detent at one end for temporarily locking each such pin into place.

11. The apparatus described in claim 10 wherein said extension includes a hinged cover plate and locking bolt.

12. The apparatus described in claim 5 wherein a sleeve extension is provided for threadable attachment to the upper end of said sleeve, the upper end of said extension including a female thread form on the inside for receiving a corresponding male thread form on said key, said key including a shoulder above the male thread form for temporarily locking said key into place on said extension.

13. In combination, a coupling apparatus for sub-surface attachment to a water supply line and an external key for engagement with said apparatus comprising a hollow open-ended vertically oriented cylindrical sleeve having a spring-loaded valve inside, a set of helical threads inside the lower end for connection to the line, and an opening at the upper opposite end for receiving the hollow shaft of said key, said sleeve including a pair of integral outwardly extending vertically oriented flanges, said flanges defining a cross section for engagement with sub-surface material to provide rotational stability, said flanges originating at diametrically opposite locations on said sleeve and extending tangentially out therefrom.

14. The combination described in claim 13 wherein each of said flanges is also provided with at least one horizontal shelf having a cross section for engagement with sub-surface material to provide lateral stability to the apparatus.

15. The combination described in claim 14 wherein said key is provided with at least one outwardly protruding pin, and the upper end of said sleeve is provided with a corresponding number of helical grooves on the inside for receiving said pins on said key, each such groove including an upward detent at one end for temporarily locking each such pin into place.

16. The combination described in claim 14 wherein the upper end of said sleeve is provided with a female thread form on the inside for receiving a corresponding male thread form on said key, said key including a shoulder above the male thread form for temporarily locking said key into place.

* * * * *